United States Patent [19]

Moskvin

[11] Patent Number: 5,016,569
[45] Date of Patent: May 21, 1991

[54] AUTOMATIC MILK COUNTER OF MILKING UNIT

[75] Inventor: Gennady A. Moskvin, Elgava, U.S.S.R.

[73] Assignee: Latviiskaya Selskhokhozyaistvennaya Akademia, Elgava, U.S.S.R.

[21] Appl. No.: 458,672

[22] PCT Filed: Apr. 11, 1989

[86] PCT No.: PCT/SU89/00089
§ 371 Date: Jan. 23, 1990
§ 102(e) Date: Jan. 23, 1990

[87] PCT Pub. No.: WO89/10686
PCT Pub. Date: Nov. 16, 1989

[30] Foreign Application Priority Data

May 5, 1988 [SU] U.S.S.R. ............... 4413032

[51] Int. Cl.$^5$ ............................................. A01J 7/00
[52] U.S. Cl. ........................... 119/14.08; 119/14.15; 119/14.17
[58] Field of Search ............... 119/14.08, 14.14, 14.15, 119/14.17

[56] References Cited

U.S. PATENT DOCUMENTS

| 4,185,586 | 1/1980 | Flocchini | 119/14.15 X |
| 4,485,763 | 12/1984 | Icking | 119/14.17 |

FOREIGN PATENT DOCUMENTS

| 793504 | 2/1981 | U.S.S.R. | 119/14.08 |
| 1020090 | 5/1983 | U.S.S.R. | . |
| 1175403 | 8/1985 | U.S.S.R. | . |
| 1297771 | 3/1987 | U.S.S.R. | . |
| 1375199 | 2/1988 | U.S.S.R. | 119/14.14 |

Primary Examiner—Robert P. Swiatek
Attorney, Agent, or Firm—Burgess, Ryan, & Wayne

[57] ABSTRACT

An automatic milk counter of a milking unit in which a programming unit and a yield sensor of each quarter of the cow's udder is made as a microprocessor device wherein a milking timer is provided with a sensitive element while each continuous milk flow receiving chamber includes a milk flow start and end sensor comprising a float with a magnet which enables the float to engage in reciprocating motion along an air drawoff pipe during the filling of a continuous milk flow receiving chamber. A drain hole is provided in the chamber which has a cross-sectional area corresponding to the milk flow rate at the milk flow start and end moments of each quarter of the cow's udder.

3 Claims, 5 Drawing Sheets

AUTOMATIC MILK COUNTER OF MILKING UNIT

TECHNICAL FIELD

The present invention relates to devices for measuring quantity of milk drawn from one cow by a milking unit, more particularly, to an automatic milk counter of a milking unit.

BACKGROUND ART

Reliable information on milk yield of each cow and on productivity of different portions of its udder is essential for goal-oriented milk production at animal farms and industrial livestock complexes, selective work on determining fitness of cows for machine milking, provision of science-based feed allowances depending on the productivity and physiological condition of each animal, and also for objective assessment of production results and zootechnic, veterinary and selective work on a dairy herd. Accurate information on milk yield makes it possible to establish optimal production links in controlling dairy farms and also to reveal subclinic forms of quarter troubles. This enables timely examination of cows and prevents contamination of mixed herd milk with milk drawn from diseased animals in machine milking, a factor decreasing losses associated with impaired quality of milk and rejection of diseased animals.

Moreover, individual milk outputs are closely related to many other important functions including milk production and breeding. For example, productivity deviations recorded at a definite stage of the estrous cycle may be one of the indications of cows in estrus.

Automation of milk recording is an urgent problem for collection of data on daily yield of each cow consumes much labour and calls for processing a large body of information.

Another important problem at the present time is to take due account of the properties of the medium under measurement in determining the quantity of milk and also of constructional features of milk counters and their operating conditions.

Discrepancy between the physical and mathematical models of measurement of separate portions of milk attributable to differences between actual and ideal measuring conditions introduces a noticeable error in determining the quantity of milk drawn from one cow. The afore-mentioned problems may not be solved by the use of the known devices which are generally characterized by low accuracy and ineffectiveness in control of production, breeding and selection at dairy farms.

PRIOR ART

There is known a milk volume or mass counter communicating via inlet and outlet pipes with a milking unit of a milking machine and with its milk pipeline and containing a sensitive metering element made up as a rotary drum (cf. SU, A No. 886, 855) or a chute (cf. SU, A No. 1,020, 090 and SU, A No. 1,297, 771) with measuring and correcting chambers and a magnet secured thereto and interacting with a means for forming separate portions of milk. The foregoing counters have fairly low measuring accuracy, a disadvantage attributable to the presence of only one corrective element made as a chamber. Calibration of the chute of the disclosed milk counter (cf. SU, A No. 1,297,771) with a counterwieght used to change its mass creates difficulties in alignment of the milk counter and limits its accuracy due to the fact that the choice of a particular corrective mass is discrete, whereas the correction factor may actually take on any other intermediate values, whether small or large, differing from the chosen mass of said counterweight.

Furthermore, in the aforesaid counters no account is taken of properties of milk, constructional features of a particular milk counter and its operating conditions at dairy farms, a disadvantage substantially decreasing accuracy thereof.

Also, the milking process may be properly monitored since the known counters include no means for monitoring the initial and final milking phases and recording the total time spent by the operator on milking the cow or drawing milk from a quarter of its udder. This complicates the attendance, increases the disease rate and reduces productivity of the dairy herd due to nonoptimal milking conditions and absence of requisite monitoring facilities.

The aforesaid counters do not provide for processing of information on the productivity of each cow and milk output from portions of its udder, a factor introducing unwanted complexities in the process of adjusting said counters for optimal portions of milk. There is also known a milk counter enabling measurement of milk yield with a static correction (cf. SU, A No. 1,175,403) and comprising a two-chamber chute having two corrective chambers and a permanent magnet interacting with a means for forming separate portions of milk, which is connected to inputs of a control console of a computer.

Such a counter is unsuitable for conventional milking machines. It may be used only with separate systems of milking and transporting milk over pipelines.

The aforesaid counter sets into the computer only one static correction factor corresponding to flat milk flow over the milk pipeline.

However, real milk flow is a variable quantity whereby additional structural elements are required to obtain a wide range of correction factors corresponding to actual mass of a separate portion of milk in the chute. The disclosed counter does not include such additional structural elements, which is generally a limiting factor. Moreover, such a counter does not provide for monitoring milk flow from each cow and from separate quarters of its udder, a disadvantage making it unfit for selective and veterinary work with a dairy herd.

There is further known an automatic milk counter of a milking unit comprising a metering device which includes for each quarter a continuous milk flow receiving chamber with a vertically disposed air drawoff pipe and a drain hole over which there is a discrete milk metering unit connected with a means for producing electrical signals indicative of metered portions of milk and a unit for recording parameters of milk flow from each quarter of udder, which includes a yield sensor and a timer (cf. ДАЧ-I. Tekhnicheskoe opisanie i instructsia po ekspluatatsii ДАЧ.00.000 TO, Rezeknensky zavod doilnykh ustavok, 1984, p. 9).

In the foregoing device, formation of portions of milk from continuous flow in drawing milk from separate quarters of udder is accomplished by a metering chute, one chamber of which holds about 50 g according to the calculated mathematical model. Therefore, as the chute turns under the action of a portion of milk supplied thereto and having predetermined mass, the shaping means forms a certain number of portions of milk with no account taken of actual mass of said portion, which differs from the design value since the physical model of the measuring process is different from its mathematical model due to the presence of errors in measuring separate portions, which are dependent on the properties of milk, structural and operational features of the milk counter.

So, when the aforesaid counter is used in the field there occur additional measurement errors which are not taken into account, a disadvantage appreciably decreasing in measuring total yield of each cow and output from each quarter of its udder.

Furthermore, the disclosed counter is initially adjusted using distilled water whose properties vary greatly from those of freshly drawn milk, a factor introducing an error in measurement of separate portions of milk.

Inasmuch as no account is taken of the difference between operating vacuum and vacuum at which the aforesaid counter is adjusted, an additional error will occur when the disclosed counter operates in the field. This error is attributable to the fact that, in the presence of additional vacuum, the metering device operates before the measuring chamber of its chute is filled to capacity.

Moreover, gas-air constituents are formed in the milk due to the action of vacuum in milking whereby the measuring chamber of the metering device will be underfilled, a factor introducing an additional error in the measuring process.

In the foregoing milk counter additional errors may be also caused by inaccuracy in production of the chute tank in the metering device, friction in the chute axial supports, improper initial adjustment of the metering device for a predetermined mass of a separate portion of milk and by many other factors, due to which the mass of each portion will not be optimal.

In the known device the process of measuring separate portions of milk is metrologically unsatisfactory for there is no computational and metrological basis for analyzing and processing the measurement results. Without statistical and metrological analyses of these results, the reliability of data obtained in measuring output from quarters of the udder will be fairly low. Furthermore, the disclosed counter does not provide for processing of the measurement results.

In operation of the known device, time periods in milking separate quarters of the udder are recorded manually, a disadvantage substantially decreasing reliability and accuracy in measuring the milking time. The recorded moments of milk flow start and end do not correspond to the reflex milk flow moments since inhibiting reactions may interfere with the action of the milk flow reflex, which leads to temporary stoppage of the milk flow. There may be also repeated milk flow at the final milking stage, which is not taken into account in the known device for the process of recording the milking time is not directly related to the milk flow.

Moreover, in the aforesaid device the circuitry of the yield sensors for each quarter of the udder and the milking timers is complicated and unreliable in operation.

Therefore, the use of the known device in zootechnic and selective work is ineffective and generally presents difficulties.

DISCLOSURE OF THE INVENTION

The object of the present invention is to create an automatic milk counter of a milking unit, in which a novel circuit configuration and design would ensure accurate and adequate monitoring of milk flow from cows by providing correspondence between physical and mathematical models of milk flow and measurement of separate portions of milk and eliminate measurement errors attributable to discrepancy therebetween by introducing in the process of measuring output from each quarter of the udder correction factors accounting for properties of milk, structural and operational features of the automatic milk counter of the milking unit, which would allow accurate and reliable zootechnic, selective and veterinary examination of each cow and increase milk yield therefrom.

There is provided an automatic milk counter of a milking unit, comprising a metering device including for each quarter of a cow's udder a continuous milk flow receiving chamber with a vertically disposed air drawoff pipe and a drain hole under which there is a proportioning unit connected with means for producing electrical signals indicative of metered portions of milk, and a unit adapted for recording milk flow parameters and including for each quarter of cow's udder a milking timer and a yield sensor connected with the respective means for producing electrical signals indicative of metered portions of milk, which, according to the invention, comprises a programming unit, while each yield sensor of each quarter of cow's udder is made as a microprocessor with leads for its individual connection to the programming unit, each milking timer for each quarter of cow's udder being provided with a sensitive element, each continuous milk flow receiving chamber having a milk flow start and end sensor for each quarter of a cow's udder, which represents a float with a magnet installed in a manner allowing its reciprocating motion along the air drawoff pipe as the continuous milk flow receiving chamber is filled, its drain hole having a cross-section corresponding to a predetermined milk flow rate at moments of milk flow start and end in each quarter of the cow's udder, when the sensitive element of the milking timer of each quarter of the cow's udder interacts with the magnet of the milk flow start and end sensor of each quarter of the cow's udder.

To record the milking time for each quarter of the cow's udder in accordance with real-time milk flow, it is advantageous that each milking timer of each quarter of the cow's udder should be made as a microprocessor.

To ensure reliable operation of each milk flow start and end sensor of each quarter of a cow's udder, it is also advantageous that its float should represent a ring having a guide slot on the internal surface thereof and arranged on the air drawoff pipe having a projection interacting with said guide slot of the float.

Such a structure of the proposed automatic milk counter of the milking unit ensures high accuracy in measuring milk yield from one cow and from separate quarters of its udder. Furthermore, the utilization of elements enabling accurate and adequate automatic monitoring of milk flow from each quarter of a cow's udder improves the milking process and permits better care of the animals and thorough udder checks. Thus, the milk counter according to the invention enhances effectiveness and accuracy in carrying out zootechnic, veterinary and selective work on a dairy herd, increases milk yield and improves its quality.

BRIEF DESCRIPTION OF THE DRAWINGS

The invention will now described further with reference to specific embodiments thereof, taken in conjunction with the accompanying drawings wherein.

BEST MODE OF CARRYING OUT THE INVENTION

Referring to the drawings the proposed automatic milk counter of a milking unit 1 (FIG. 1) having a collector 2 connected via hoses 3 to a pulsator 4 communicating with a vacuum pipeline 5 of a milking machine by means of a hose 6 and a milk vacuum cock 7 comprises a metering device 8 communicating with the collector 2 by means of hoses 9 and with an evacuated milk pipeline 10 of the milking machine by means of hose 11 and the milk vacuum cock 7. Secured to a casing 12 of the metering device 8 by means of a bracket 13 is a unit 14 adapted for recording milk flow parameters and provided with bus connectors 15, 16, 17, 18 and current leads 19, 20. The panel of the unit 14 (FIG. 2) accommodates a digital indicator 21 reading total yield from each cow, digital indicators 22, 23, 24, 25 showing output from a respective quarter of a cow's udder, a digital indicator 26 showing total milking time for each cow and digital indicators 27, 28, 29, 30 showing milking time for a respective quarter of the cow's udder. The digital indicators 21, 22, 23, 24, 25, 26, 27, 28, 29, 30 are cleared by depressing respective butons 31, 32, 33, 34, 35, 36.

The metering device 8 (FIG. 1) comprises four identical continuous milk flow receiving chambers 37 (FIG. 2), each of which is suited to a respective quarter of the cow's udder, said chambers having hoses 38 to feed milk from each quarter of the cow's udder, four proportioning units 39, each of which is provided with a hydraulic compensation chamber 40, and four means 41 for producing electrical signals indicative of metered portions of milk, each means for producing electrical signals being connected with the respective proportioning unit 39, a level 42 serving to level said proportioning units before milking.

The unit 14 (FIG. 1) for recording milk flow parameters includes a yield sensor 43 for each quarter of the cow's udder and a milking timer 44 for each quarter of the cow's udder. The sensor 43 is a microprocessor device comprising a microprocessor 45 connected to a power supply 46 and a unit 47 designed to control clock pulse generator frequency. The microprocessor 45 is also connected to the digital indicator 25, to the bus connector 15 and to the shaping means 41. The timer 44 is a microprocessor device comprising a microprocessor 48 connected to a power supply 49, a reference frequency control and stabilization unit 50 and an audible signalling unit 51 indicating the final milking stage, said units being connected to respective inputs and outputs of the microprocessor 48. Besides, the microprocessor 48 is connected to the digital indicator 30 and has a bus connector 52. The timer 44 is provided with a sensitive element 53 (FIGS. 3, 4) made as a reed relay installed in close proximity to the continuous milk flow receiving chamber 37.

Each of the chambers 37 (FIG. 3) has a milk feed pipe 54 connected with a respective hose and a vertically disposed air drawoff pipe 55. Each chamber also comprises a milk flow start and end sensor for a respective quarter of a cow's udder, said sensor being made as a float 56 with a magnet 57 installed in a manner allowing its reciprocating motion along the air drawoff pipe 55. Provided in the bottom of the chamber 37 is a drain hole 58 calibrated to a milk flow rate of about 200 g/min. Located under said hole is the chute of the proportioning unit 39 (FIG. 2) having two chambers 59, 60 and arranged in a manner allowing it to turn about an axis 61, the turning being limited by stops 62. The milk is drained through a branch pipe 63.

Each shaping means 41 (FIG. 1) includes a magnet 64 contained within the chamber 60 and a reed relay 65 arranged in close proximity to the chamber 60 and having its contacts connected to the microprocessor 45 of the yield sensor 43 of each quarter of cow's udder.

Figure 1:
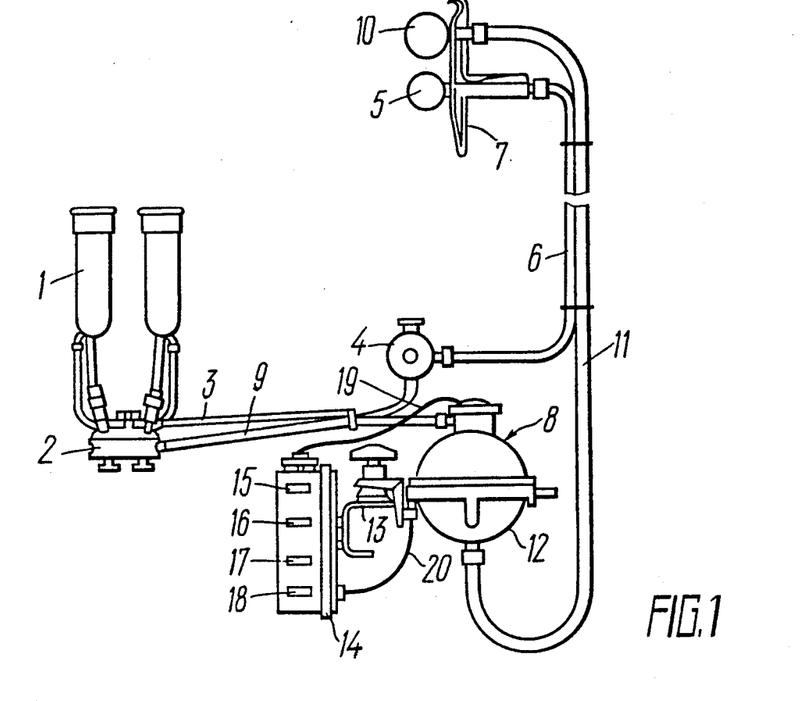
FIG. 1 is a general view of a milking unit with an automatic milk counter in the operating position according to the invention.

The automatic milk counter of the milking unit according to the invention also comprises a programming unit 66 representing a compact split keyboard contact matrix unit 67 having a bus connector 68 for its successive connection to one of the bus connectors 15, 16, 17, 18 (FIG. 1).

Figure 4:
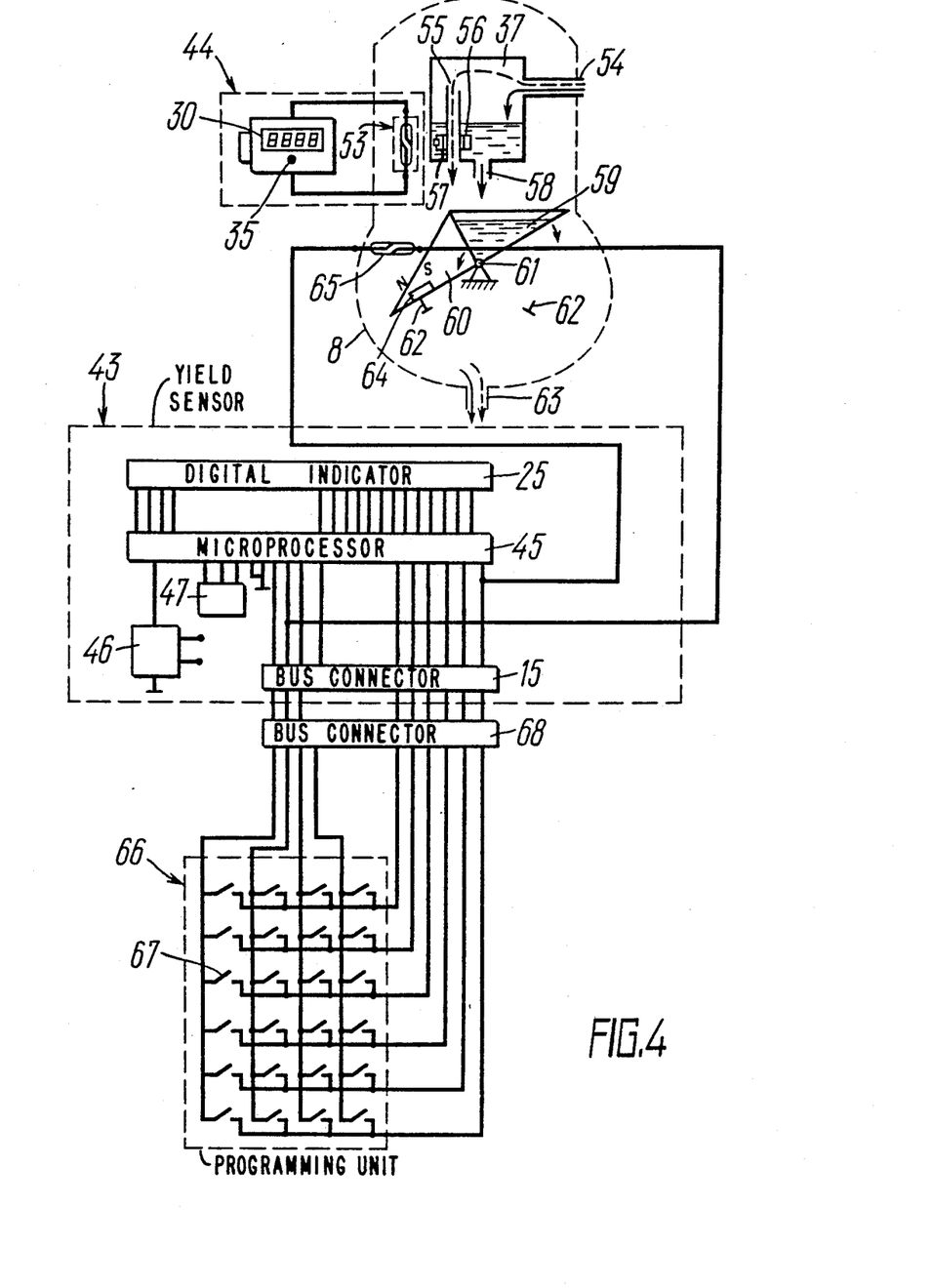
FIG. 4 shows diagrammatically the structure and circuit arrangement of one of the four modules of the automatic milk counter of the milking unit and a programming unit in the operating position according to the invention.
Figure 5:
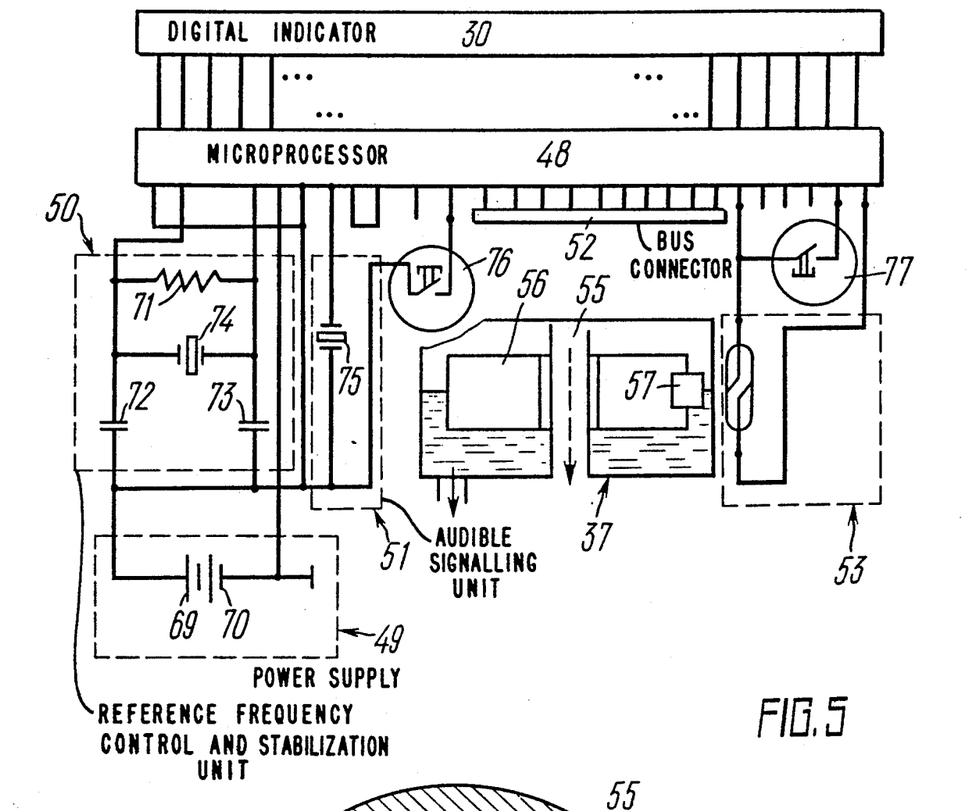
FIG. 5 is a schematic diagram of a milking timer of each quarter of a cow's udder according to the invention.

FIG. 5 is a schematic diagram of the milking timer 44 of each quarter of cow's udder, which comprises a microprocessor device. The power supply 49 of the microprocessor 48 includes series-connected storage cells 69 and 70. The clock frequency control and stabilization unit 50 comprises such elements as a resistor 71, capacitors 72, 73 and a resonator 74, which are connected with the elements of the clock pulse generator circuit found directly in the integrated circuit of the microprocessor 48. The audible signalling unit 51 indicating the final milking stage includes a piezoelectric element 75 connected to the microprocessor 48. A control button 76 associated with the element 75 is connected with the microprocessor 48 and disposed on the programming unit 66 (FIG. 4). The timer 44 (FIG. 5) may be turned on and off manually by means of a button 77. The bus connector 52 is used to connect the programming unit 66 (FIG. 4) to the microprocessor 48 (FIG. 5).

Figure 6:
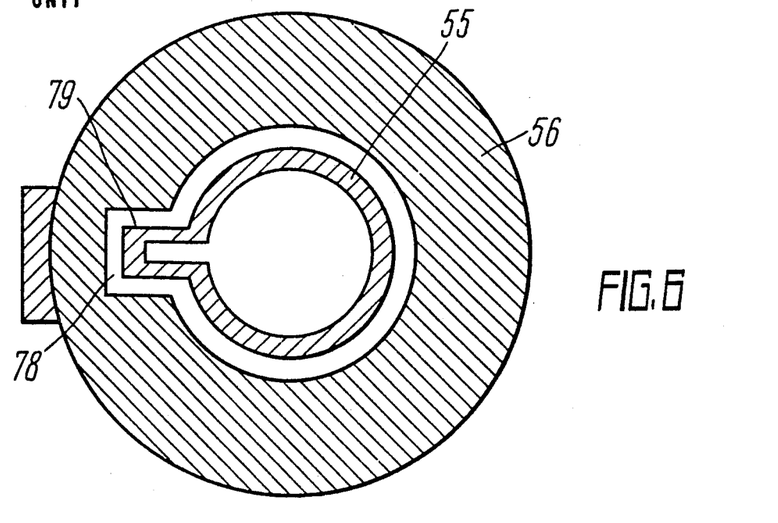
FIG. 6 shows a preferred embodiment of a float acting as a milk flow start and end sensor of each quarter of a cow's udder according to the invention.

To ensure reliable operation of the milk flow start and end sensor of each quarter of cow's udder, its float 56 (FIG. 6) is made as a ring with a guide slot 78 on the internal surface thereof, the air drawoff pipe 55 having a projection 79 interacting with the guide slot 78 of the float 56.

Figure 7:
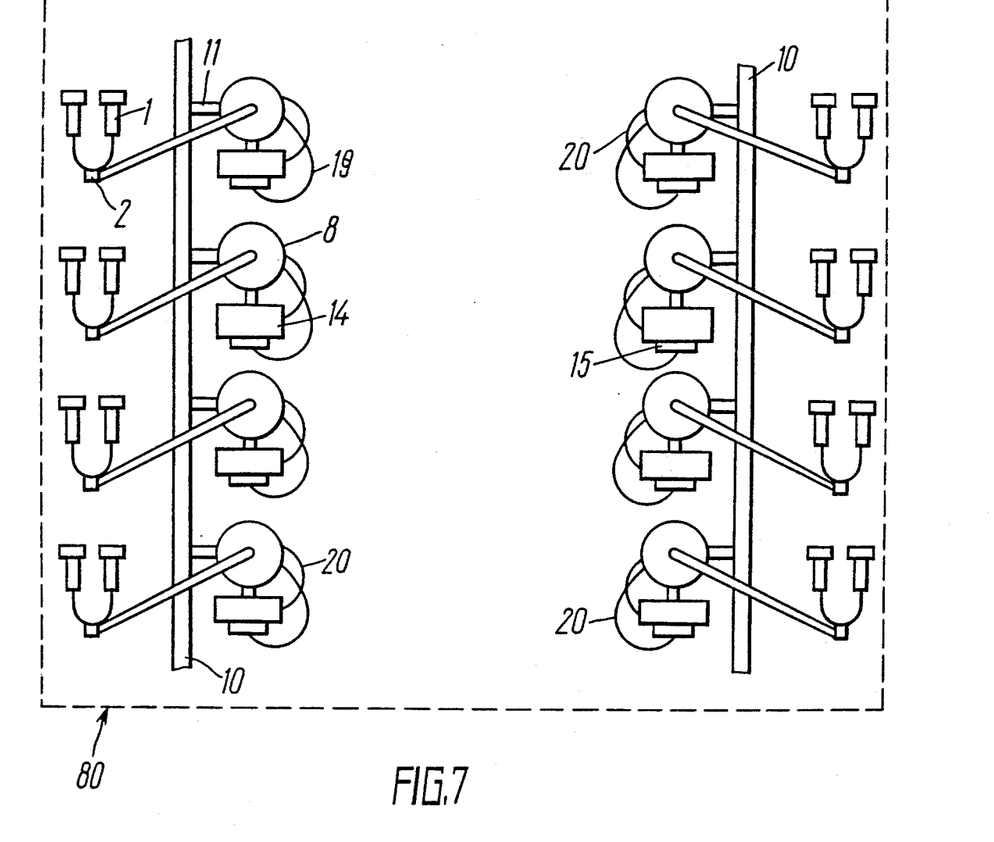
FIG. 7 shows arrangement of the proposed automatic milk counters on the herringbone milking bail.

To milk several animals simultaneously, for example, with a herringbone bail 80 (FIG. 7) comprising the necessary number of the proposed automatic milk counters, one programming unit 66 may be successively connected to the unit 14 (FIG. 1) for recording milk flow parameters of each animal.

The proposed automatic milk counter of the milking unit operates in the following manner.

Before operation, it is necessary to turn on the independent power supplies 46 and 49 (FIG. 3) of the yield sensor 43 of each quarter of cow's udder and the milking timer 44 of each quarter of cow's udder. Then the programming unit 66 (FIG. 4) is successively connected via the bus connector 68 to the respective bus connectors 15, 16, 17, 18 (FIG. 1) of the sensors 43 (FIG. 3), the following step being preliminary calibration of each of the proportioning units 39 (FIG. 2) using the available programs and correction algorithms accounting for the properties of milk, structural features of the proportioning units 39 and peculiarities of their operation in true-to-life simulation of the milking process using freshly drawn milk from one cow. Using a correction factor it is possible to obtain correspondence between the physical and mathematical models of measurement of portions of milk without: altering and optimizing the structure of the proportioning units 39; introducing changes in the operating conditions of the automatic milk counter of the milking unit; and making an additional adjustment of the means 41 for producing electrical signals indicative of metered portions of milk in order to obtain optimal vacuum conditions in operations.

On completion of digital simulation of an optimal mass of a discrete portion provided by one of the proportioning units 39 taking into account its structural and operational features and the properties of milk calculated by the use of the microprocessor 45 (FIG. 3), the numerical value of optimal mass of a discrete portion of milk equalling, for example, 0.48756 kg for said proportioning unit 39 is set into the storage of the microprocessor 45 (FIG. 3) of the sensor 43 by closing manually the contacts of the respective matrices 67 (FIG. 4). Said value equalling 0.48756 kg is displayed on the digital indicator 25 (FIG. 2) corresponding to the given proportioning unit 39. For other proportioning units 39 the numerical value of optimal mass of a discrete portion of milk may differ from 0.48756 kg. After setting corresponding numerical values of optimal mass of discrete portions of milk into the digital indicators 22, 23, 24 and 25, it is necessary to program the operating conditions of the microprocessor 48 (FIG. 3) of the milking timer 44 of each quarter of cow's udder by the use of the programming unit 66 (FIG. 4). To this end, the button 76 (FIG. 5) is activated to adjust the audible signalling unit 51 for a time corresponding to the milking termination period determined from preliminary data and equal, for example, to 4 minutes and 15 seconds. In simultaneous operation with several milking units (FIGS. 1, 7), the machine milking operator will, thus, be able to choose optimal routes from one milking unit 1 to another and prevent the milking cups from being kept too long on the teats using the signal derived from the unit 51 and indicating the final milking stage. This provides for full and clean milking of cows and essentially precludes "dry" milking presenting a health hazard, a factor enabling fuller use of the genetic productivity potential of each animal and increasing milk yield.

Figure 2:
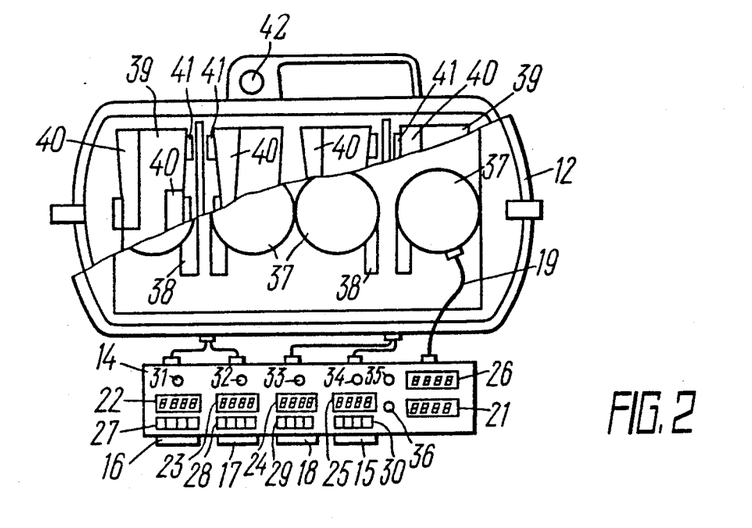
FIG. 2 is a top general view of a metering device of the automatic milk counter of the milking unit according to the invention.

On completion of preliminary programming of the yield sensor 43 and the milking timer 44 (FIG. 3) of each quarter of cow's udder, the milking unit 1 (FIG. 1) is connected through the milk vacuum cock 7 to the vacuum pipeline 5 and to the evacuated milk pipeline 10 of the milking machine, the milking unit 1 being also connected to cow's udder. Thereafter milk is drawn from separate quarters of the udder. The milk drawn from each quarter of the udder is supplied from the milking unit 1 through the collector 2, the hose 9 and the branch pipe 54 (FIG. 4) to one of the milk flow receiving chambers 37. The gas-air constituent is removed from continuous milk flow through the air drawoff pipe 55, while the pulsating portions of milk get into the lower section of the chamber 37. Owing to the fact that the hole 58 in the bottom of the chamber 37 is calibrated to suit a predetermined milk flow rate corresponding to the initial and final milking stages of quarters of cow's udder, say to a milk flow rate of 200 g/min, the chamber 37 is gradually filled with milk as the milk flow reflex slowly works to a full extent at the initial milking stage. The float 56 with the magnet 57 is slowly raised along the pipe 55 as the milk level in said chamber increases. The float 56 reaches the level of the reed relay acting as the sensitive element 53, said reed relay being affected with the magnetic field set up by the magnet 57. The contacts of the reed relay acting as the sensitive element 53 are closed and an electrical signal comes to a respective input of the microprocessor 48 (FIG. 4) of the milking timer 44. This marks the beginning of the present milking time period for a given quarter of cow's udder, presented on the digital indicator 30 (FIG. 2).

At this time a portion of milk continuously flows from the chamber 37 through the hole 58 to one of the other chambers, for example, the chamber 59. As the mass of milk reaches a magnitude corresponding to the preset numerical value of optimal mass of a discrete portion of milk, displayed on the digital indicator 25 (FIG. 2), displacement of the centre of gravity of the chute causes its turn about on the axis 61 thereof until it reaches one of the stops 62 (FIG. 4). As the chute is turned, the magnet 64 of the shaping means 41 (FIG. 2) moving together with the chamber 60 (FIG. 4) affects with its magnetic field the reed relay 65 causing contacts thereof to close. As a result, the respective input of the microprocessor 45 of the sensor 43 (FIG. 3) receives an electrical signal. Next, milk flows to the chamber 60 (FIG. 4) and the subsequent electrical signal to be fed to the input of the microprocessor 45 is shaped in a manner similar to that described above. The microprocessor 45 sums up the electrical signals successively fed to its input from the reed relay 65. The numerical value corresponding to the number of said signals and, in effect, to the number of portions of milk drawn from one of the quarters of cow's udder is displayed on the digital indicator 25.

The unit 51 (FIG. 5) furnishes an audible signal as soon as the milking is about to be over. Upon receipt of this signal, the machine milking operator manually completes the milking leaving no milk in the udder. This is done to keep the cows healthy and to draw the fattest milk remaining.

Figure 3:
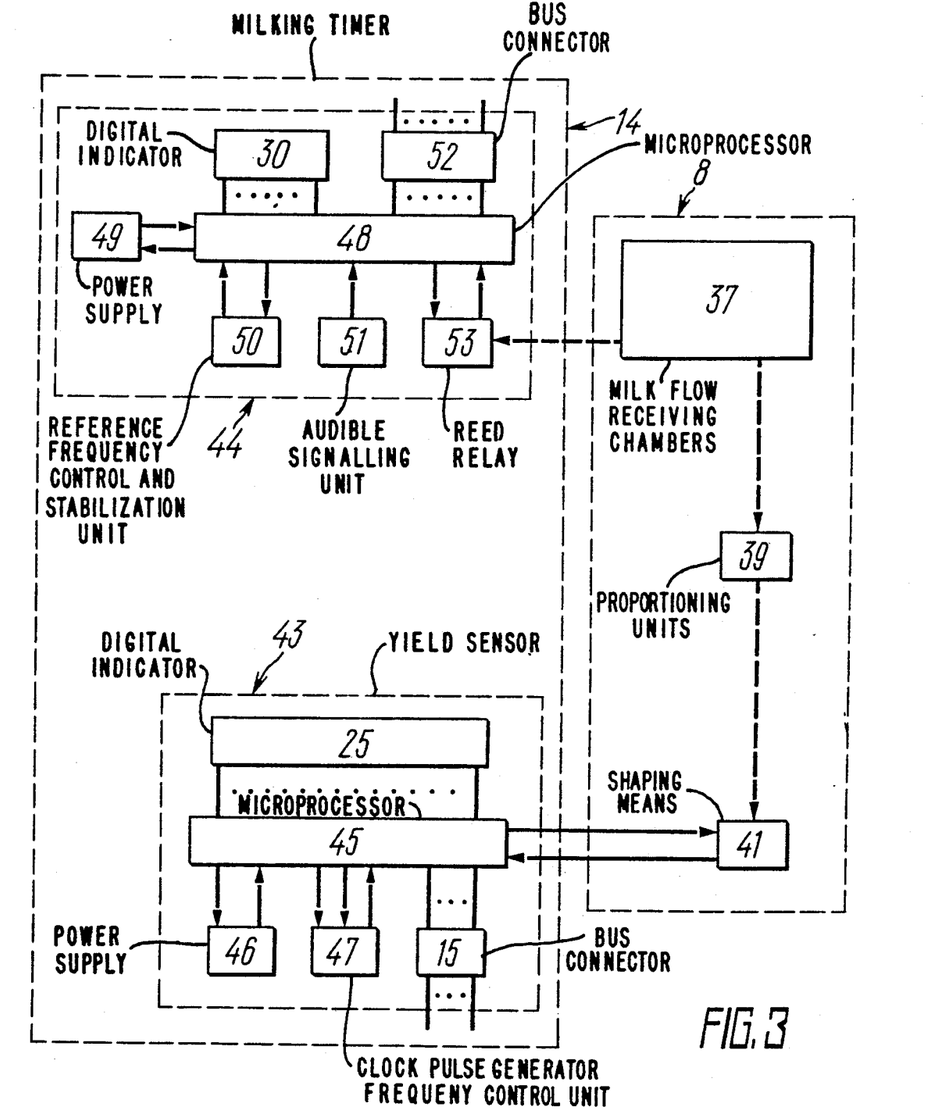
FIG. 3 is a structural and functional diagram of the automatic milk counter of the milking unit according to the invention.

At the end of the milking process, milk flow to the chamber 37 (FIG. 4) is stopped, the milk level decreases and there comes a moment when the float 56 with the magnet 57 is at the same level with the reed relay acting as the sensitive element 53 of the milking timer 44 (FIG. 3). In this case an electrical signal comes to the respective input of the microprocessor 48.

If after a predetermined time period, for example, 20 to 25 seconds the float 56 (FIG. 4) does not change its position and the contacts of the reed relay remain closed, the microprocessor 48 (FIG. 3) develops a control signal to stop the milking time measurement, thereby recording the milking end moment, while the digital indicator 30 reads the real milking time for a given quarter of cow's udder. Thus, a delay in generation of said control signal by the microprocessor 48 is required to account for milk flow that may occur at the end of the milking process and to record accurately the milking end moment, the delay being chosen considering real time at which said afterflow is possible. Besides, said delay is needed to allow the milk remaining under the float 56 to leave the chamber 37.

Simultaneously milk outputs from quarters of cow's udder are presented on the digital indicators 22, 23, 24, 25 (FIG. 2) and the total milk yield is displayed on the indicator 21. Also, the milking time period for each quarter of the udder is presented on the indicators 27, 28, 29, 30 and the total milking time is shown on the indicator 26. After the obtained reference data are transferred to a recording medium, all the digital indicators 21, 22, 23, 24, 25, 26, 27, 28, 29 and 30 are cleared by depressing the buttons 31, 32, 33, 34, 35 and 36 whereupon operation of the counter will be repeated.

As cows are milked with the herringbone bails 80 (FIG. 7) for zootechnic or selective purposes when a great number of counters is required (8×4=32), one programming unit 66 (FIG. 4) may be used for the entire bail 80, an advantage simplifying construction and maintenance of the automatic milk counters and reducing their cost.

Moreover, the utilization of the portable split programming unit 66 in the proposed automatic milk counters prevents unauthorized persons from reprogramming the automatic counter, a factor essentially precluding personal programming errors, as well as intentional and unintentional distortions of data by interested persons or farm attendants.

The proposed automatic milk counter of the milking unit relates to a new class of "intellectual" instruments characterized by more accurate initial data for effective control of milk production and herd breeding, another advantage thereof being more efficient zootechnic, veterinary and selective work on a dairy herd and higher yields. Moreover, construction and operation of the proposed counters are substantially simplified and their functional capabilities are increased. Also, the automatic milk counters according to the invention are compatible with IC computers.

INDUSTRIAL APPLICABILITY

The invention may be used in milking machines of all known types both in cowshed and parlour milking.

I claim:

1. An automatic milk counter of a milking unit, comprising a metering device including for each quarter of a cow's udder a continuous milk flow receiving chamber (37) with a vertically disposed air drawoff pipe (55) and a drain hole (58) under which there is a proportioning unit (39) connected with means (41) for producing electrical signals indicative of metered portions of milk, and a unit (14) adapted for recording milk flow parameters and including for each quarter of the cow's udder a milking timer (44) and a yield sensor (43) connected with the respective means (41) for producing electrical signals indicative of metered portions of milk, characterized by a programming unit (66) and the yield sensor (43) of each quarter of the cow's udder is made as a microprocessor device with leads for its individual connection to the programming unit (66), the milking timer (44) of each quarter of the cow's udder being provided with a sensitive element (53), while each continuous milk flow receiving chamber (37) includes a milk flow start and end sensor for each quarter of the cow's udder, said milk flow start and end sensor comprising a float (56) with a magnet (57) installed in a manner allowing the float to engage in reciprocating motion along the air drawoff pipe (55) in the process of filling the continuous milk flow receiving chamber (37) whose drain hole (58) has a cross-sectional area corresponding to a milk flow rate at the milk flow start and end moments of each quarter of the cow's udder, when the sensitive element (53) of the milking timer (44) of each quarter of the cow's udder interacts with the magnet (57) of the milk flow start and end sensor of each quarter of the cow's udder.

2. An automatic milk counter of a milking unit as claimed in claim 1, characterized in that the milking timer (44) of each quarter of the cow's udder is made as a microprocessor device.

3. An automatic milk counter of a milking unit as claimed in claim 1, characterized in that the float (56) of the milk flow start and end sensor of each quarter of the cow's udder represents a ring with a guide slot (78) on the internal surface thereof and is installed on the air drawoff pipe (55) having a projection (79) interacting with the guide slot (78).

* * * * *